(12) United States Patent
Piszczek et al.

(10) Patent No.: US 9,266,047 B2
(45) Date of Patent: Feb. 23, 2016

(54) MIST ELIMINATOR CONFIGURATION FOR DROPLET REMOVAL IN FOULING SERVICE

(71) Applicant: ExxonMobil Research and Engineering Company, Annandale, NJ (US)

(72) Inventors: Robert Piszczek, Spring, TX (US); Todd P. Marut, Madison, NJ (US); Brian D. Albert, Fairfax, VA (US); Vikram Singh, Fairfax, VA (US); Simon Y. Yeung, San Francisco, CA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 14/323,231

(22) Filed: Jul. 3, 2014

(65) Prior Publication Data
US 2015/0128543 A1 May 14, 2015

Related U.S. Application Data

(60) Provisional application No. 61/858,369, filed on Jul. 25, 2013.

(51) Int. Cl.
*B01D 45/00* (2006.01)
*B01D 45/08* (2006.01)
(Continued)

(52) U.S. Cl.
CPC ............ *B01D 45/08* (2013.01); *B01D 45/04* (2013.01); *B01D 45/16* (2013.01); *B01D 50/002* (2013.01); *F01M 13/04* (2013.01); *F01M 2013/0433* (2013.01)

(58) Field of Classification Search
CPC ...... B01D 45/08; B01D 45/16; B01D 50/002; F01M 13/04; F01M 2013/0433
USPC .................................. 55/442–446, 462–465
See application file for complete search history.

(56) References Cited

U.S. PATENT DOCUMENTS

| | | | | |
|---|---|---|---|---|
| 877,460 | A * | 1/1908 | Brunner et al. | 55/444 |
| 3,658,484 | A * | 4/1972 | Bright | 422/255 |

(Continued)

FOREIGN PATENT DOCUMENTS

| | | |
|---|---|---|
| EP | 0269864 A1 | 6/1988 |
| EP | 0353679 A1 | 2/1990 |

(Continued)

OTHER PUBLICATIONS

PCT Application No. PCT/US2014/046996, Communication from the International Searching Authority, International Search Report, Form PCT/ISA/210, dated Nov. 17, 2014.

(Continued)

*Primary Examiner* — Dung H Bui
(74) *Attorney, Agent, or Firm* — Malcolm D. Keen; Andrew T. Ward; Glenn T. Barrett

(57) ABSTRACT

Vane type mist eliminator segments are arranged in a plurality of tiers at separate vertically spaced locations in a tower, typically of the upright, cylindrical type, with the eliminator at each tier covering only a portion of the cross section of the tower. The eliminator segment(s) in each tier are laterally displaced in the tower from the adjacent vertically spaced eliminator segments to form a staggered configuration for the segments. Each mist eliminator preferably extends over 50-70% of the cross-sectional area of the tower to leave an open flow passage in the tier; the staggering of the segments and the associated flow passages defines an upward tortuous or zig-zag open flow path for vapors ascending the tower through the open flow passages when the eliminator segment(s) become fouled in use.

19 Claims, 4 Drawing Sheets

(51) Int. Cl.
  *B01D 45/16* (2006.01)
  *B01D 50/00* (2006.01)
  *B01D 45/04* (2006.01)
  *F01M 13/04* (2006.01)

(56) References Cited

U.S. PATENT DOCUMENTS

| | | | | |
|---|---|---|---|---|
| 3,888,642 | A | * | 6/1975 | Toyama ............................. 96/376 |
| 4,072,478 | A | | 2/1978 | Regehr et al. |
| 4,157,250 | A | * | 6/1979 | Regehr et al. ................... 96/299 |
| 4,204,847 | A | | 5/1980 | Ko |
| 4,938,787 | A | | 7/1990 | Simmerlein-Erlbacher |
| 5,041,146 | A | | 8/1991 | Simmerlein-Erlbacher |
| 5,203,894 | A | | 4/1993 | Chowaniec |
| 5,230,725 | A | * | 7/1993 | Chowaniec ..................... 55/440 |
| 5,425,924 | A | * | 6/1995 | Finley ............................ 422/220 |
| 5,464,459 | A | * | 11/1995 | VanBuskirk et al. ........... 96/356 |
| 5,632,934 | A | | 5/1997 | Billingham et al. |
| 5,749,930 | A | * | 5/1998 | Wolf et al. ....................... 96/228 |
| 5,882,386 | A | * | 3/1999 | McAferty et al. .............. 96/378 |
| 8,328,918 | B2 | * | 12/2012 | Kanka et al. .................... 96/232 |
| 9,005,340 | B2 | * | 4/2015 | Azwell et al. ................... 95/268 |
| 2009/0071337 | A1 | | 3/2009 | Nieuwoudt |

FOREIGN PATENT DOCUMENTS

| | | |
|---|---|---|
| EP | 1588750 A1 | 10/2005 |
| JP | 2005023824 A | 1/2005 |

OTHER PUBLICATIONS

PCT Application No. PCT/US2014/046996, Communication from the Internaticmai Searching Authority, Written Opinion, Form PCT/ISA/237, dated Nov. 17, 2014.

* cited by examiner

MIST ELIMINATOR CONFIGURATION FOR DROPLET REMOVAL IN FOULING SERVICE

CROSS-REFERENCE TO RELATED APPLICATIONS

This application claims the benefit of priority from U.S. Provisional Application 61/858,369, filed on Jul. 25, 2013, entitled "Mist Eliminator Configuration for Droplet Removal in Fouling Service", the entirety of which is incorporated herein by reference.

FIELD OF THE INVENTION

The present invention relates to a mist eliminator configuration for the removal of entrained liquid droplets from flowing vapor streams.

BACKGROUND OF THE INVENTION

Demisters or mist eliminators are devices used for removing entrained liquid droplets from a gas stream and are often necessary to be used where any liquid entrainment in vapor stream is not acceptable, for example—compressor suction lines. As its name implies, a demister is used for removal of the mist from the gaseous phase. Demisters, which are often fitted just below the top vapor outlet of a vapor liquid separator, function by coalescing smaller liquid droplets into larger droplets by obstructing their path. Obstruction of path causes increased collisions among the liquid droplets and most of the droplets stick together and form bigger droplets which are too heavy to rise with the gas stream. The bigger liquid drops then fall into the pool of liquid below. The gas component of the stream is not affected by the obstruction in the path and escapes through the vapor outlet at the top of the demister.

The obstruction in the path of liquid droplets can be achieved by a variety of geometries. There are two general types of mist eliminators—mesh and vane. Demisters may be mesh type coalescers, vane packs and these may both assist empty drums by increasing the gas and liquid separation efficiency. One widely applicable type of mist eliminator is the Crinkled Wire Mesh Screen (CWMS) which is made of metal or plastic wire with typical diameter of 0.1 to 0.5 mm, loosely knitted in a form resembling a cylindrical net. This tube is flattened to form a two-layer strip, which is then crimped in a diagonal pattern with ridges; when these strips are laid together, the ridges slant in alternate directions, forming an open structure through which gas flows freely. Such mesh pads can efficiently capture mist droplets as small as 5 microns.

The second main type of demister, the vane or chevron type, comprises of closely spaced corrugated plates that force mist-laden gas to follow serpentine paths. These devices are generally not efficient for mist droplets smaller than about 20 microns, but they are more fouling resistant and sturdier than mesh pads, and impose a lesser pressure drop. Vane arrays can be mounted horizontally or vertically. They are preferred in applications involving high vapor velocities, low available pressure drop, viscous or foaming liquids, lodging or caking of solids, slugs of liquid, or violent upsets. They are sometimes used in combination with mesh pads for optimum performance in certain situations.

U.S. Pat. No. 4,072,478 (Regehr) discloses a vane type demister in which a number of generally V-shaped vanes are arranged between partition walls to define rectangular channels through which the gas stream flows. Each vane has a chevron shaped directing groove with flat run-off walls between the ends of the grooves and the partitioning walls.

Another demister is described in U.S. Pat. No. 4,204,847 (Ko) with chevron shaped baffles or vanes disposed in the gas stream with the upstream and downstream parts of each gas flow passage between the baffles oriented in different planes. Mist trapping flanges project into the upstream and downstream branches of each of the flow passages.

U.S. Pat. No. 5,203,894 (Chowaniec) describes a mist eliminator pack made up of non-parallel sheets with integrally formed offset tabs in the first edges of the sheets which are secured to the adjacent sheets to form an integral pack with uniform flow paths between the sheets.

The mist eliminator described in U.S. Pat. No. 5,464,459 (VanBuskirk) has a number of generally chevron-shaped impingement baffles with short entry and outlet sections and lower and upper sections arranged at different angular inclinations. The lower end of the entry section may have a toothed configuration to promote drainage of accumulated liquid.

Traditional vane-type mist eliminators are designed for moderate fouling services and span the entire cross sectional area of the column or tower in which they are located. Over time with continuous operation, the mist eliminators can begin to foul and the pressure drop through the device may increase gradually up to the design limit. Unit capacity may be reduced to prevent excessive pressure drop and equipment failure but eventually, the fouling becomes excessive and results in poor liquid droplet removal performance from the vapor phase to the extent that the mist eliminator requires replacement. Frequent unit outages for inspection and maintenance results in significant cost and loss of revenue.

SUMMARY OF THE INVENTION

We have now developed a mist eliminator system which is more resistant to fouling. The mist eliminator is particularly useful in applications where heavy oils are being processed, for examples, in the scrubbing sections of fluid cokers (including the Exxon FLEXICOKER™ type with its attached gasifier), coker fractionators (both delayed coker and fluid coker units), crude oil vacuum distillation towers, as well as other heavy oil distillation or separation towers or columns.

According to the present invention, vane type mist eliminator segments are arranged in a tower with a plurality of layers (or tiers) at separate vertically spaced locations in a tower with the area of the eliminator segment (or segments) at each tier covering only a portion of the cross section of the tower; the eliminator segment or segments in each tier are laterally displaced in the tower from the segment or segments in the adjacent tier or tiers to form a staggered configuration for the segments. This staggered arrangement, in turn, defines an upward tortuous open flow path for vapors ascending the tower through which the vapors may pass without passing through the eliminator segment(s). When the eliminator segment(s) become fouled in use, the vapors can by-pass the fouled segments to continue to pass up the tower without an unacceptable pressure drop.

In a tower of relatively limited diameter, typically not more than about 2 m (about 6.5 feet), for example, about 1.2 m. (about 4 feet) each tier may have a single mist eliminator segment with a single open flow passage defined by the free chordal edge of the segment and the opposing face of the tower. In larger towers, e.g. greater than 2 m. (about 6.5 feet), however, it normally becomes necessary or desirable to use a plurality of segments in each tier spaced across the cross-section of the tower and separated from one another by open vapor flow passages so that the ascending vapors do not have to travel along excessively convoluted flow paths with long horizontal travel around each segment when it becomes fouled.

The total cross-sectional area of the tower occupied by the eliminator segment(s) is preferably from 50 to 70% of the cross-sectional area of the tower. To ensure, however, that the vapors with the entrained liquid droplets actually pass through the segments, the area of the open flow passages should be selected according to the pressure drop across the segments both in the clean condition and in the fouled condition.

Typically, the tower will be of the conventional upright, cylindrical type with a circular cross-section and a vertically-oriented axis. The mist eliminator segment(s) in each tier and the open flow passages are laterally displaced from the segment(s) and open flow passage(s), respectively, in the next adjacent vertical tier so that the open flow passages define a tortuous or zig-zag open flow path for vapors ascending the tower. In this specification the term "segment" is used to refer to a unit of the mist eliminator regardless of its shape. In the cases where the unit fits against the curved inner shall plating of the tower, at least part or all of the unit will have an edge which is an arc of a circle and when the units are nested alongside one another as described further below, the "segments" will be typically be rectangular; rectangular segments may be referred to as "bricks". Rectangular segments may be used in combination with segments having arcuate edges as described below.

DRAWINGS

DETAILED DESCRIPTION

Figure 1:
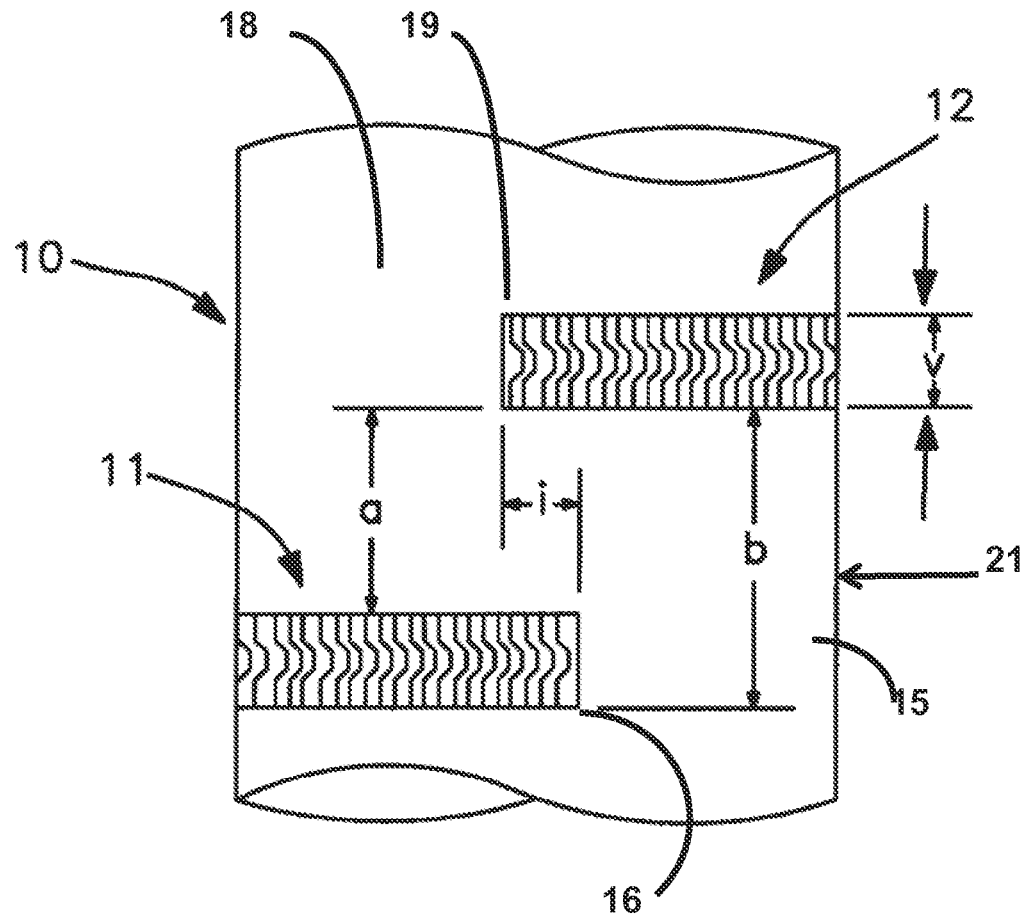
FIG. 1 is a simplified vertical section of the mist eliminator section of a tower with staggered vane-type mist eliminators in two tiers.

The present mist eliminator configuration is intended for use in towers (otherwise referred to as columns) or vertical drums which have an upward flow of vapor (or gas) potentially containing entrained liquid droplets which are to be removed to the extent feasible given other operating constraints on the tower and the unit in which it is being operated. The configuration is of particular utility in operating environments where fouling is likely, whether from suspended solid particulates or from the entrained liquid droplets themselves. It is especially useful for the removal of heavy oil droplets from vapor streams in petroleum refining units used in refining operations such as crude oil distillation towers, especially vacuum distillation towers, delayed coker fractionators, fluid coker fractionators, FLEXICOKER fractionators, fluid coker scrubbers (the section located downstream of the coker reactor cyclones), FLEXICOKER coker scrubbers (the section located downstream of the coker reactor cyclones), directly above wash zones and spray chambers in heavy hydrocarbon fractionators and other units where the fouling potential is moderate to severe. Often, the demister may operate an elevated temperature, typically above about 300 or even 400° C. (above about 570 or 750° F.) when the fouling with heavy, high boiling petroleum fractions is most likely to occur.

The eliminators used in the present configuration are the vane type in view of its inherent superior resistance to fouling as compared to the CWMS type with the heavy oil vapor streams encountered in the typical operating environments set out above. Vane type eliminators are characterized by a plurality of plates, typically about 1-2 mm. thick, arranged in the vapor flow stream and generally parallel to the flow stream to define a multiplicity of vapor flow passages between the plates. The plates are arranged to promote coalescence of entrained liquid droplets. One type of vane eliminator has parallel flat plates arranged in tiers in a chevron type arrangement at different angles with respect to the direction of vapor flow so that the vapor stream has to undergo changes in direction from tier to tier to induce inertial forces which tend to throw the liquid droplets out of the flow and onto the plates where they join together to form larger droplets which then trickle downwards across the plates to the liquid catchment tray beneath. Alternatively, the eliminators may be of the chevron type in which the plates themselves have portions arranged at different angles with respect to the direction of flow of the vapor stream so that the stream is subjected to inertial forces generated by changes in the direction of flow with the result that the droplets are separated from the vapor. Typical chevron type mist eliminators may have tabs, teeth, blades or other additional flow deflection elements which are intended (or so claimed by the manufacturers) to improve droplet separation and removal. Mist eliminators of this type are shown, for example, in U.S. Pat. Nos. 5,203,894 and 5,464,459, mentioned above; they are also commercially available, e.g as Amistco's Double Pocket Vane eliminators.

The vanes in vane type mist eliminators may be quite complicated in form, approximating to the grid or structured packings used in distillation and vapor/liquid contact towers. Eliminators of this type have the vanes in an ordered, structured arrangement with individual vanes fixed together, e.g. by welding, to form an array which functions as the eliminator. A preferred embodiment of the present eliminator configuration uses eliminators in each tier which are characterized by a structure similar to that shown in U.S. Pat. No. 5,464,459 and which comprises a plurality of generally spaced-apart, generally aligned, parallel impingement type baffles or blades, which normally extend generally across vapor stream to define a non-linear or tortuous vapor flow path for the liquid-rich vapor stream passing between the respective pairs of impinging baffles. The vapor flow path is typically about 12 to 25 mm. wide between the blades. Each of the impingement baffles or blades includes a short, straight, axially aligned (axially with respect to the direction of vapor flow) inlet section having a lower leader edge, and a lower angled section, a short, straight, axially aligned interconnecting section, an upper angled section, and a short, straight, axially aligned outlet section leading up to an outlet edge. The blade includes an upper angled section having a greater angular inclination from the axis of the eliminator and of the gas flow direction than the lower angled section. For example, the inclined angle of the lower section is about 30° from the vertical axis, while the inclined angle of the upper section is about 45°, (e.g. +5%) from the vertical axis, so that the lower angled section provides improved drainage of collected liquid from the liquid-rich vapor stream and the connecting section provides reduced pressure drop without substantial re-entrainment of the collected liquid. This eliminator can be compared to the FLEXICHEVRON® style VIII eliminator from Koch-Glitsch; reference is made to U.S. Pat. No. 5,464,459 for a detailed description of this type of mist eliminator. Unlike the eliminator configuration shown in U.S. Pat. No. 5,464,459, however, where the individual eliminators extend wholly across the entire cross section of the tower (see FIG. 2), the present configuration leaves an open area at the edge of the eliminator in each tier.

Another preferred type of vane mist eliminator comprises the structured packing described in U.S. Pat. No. 5,632,934 (Billingham) to which reference is made for a detailed description of the packing. This packing is commercially available from Koch-Glitsch as FLEXIPAC™ in various options such as and FLEXIPAC™ 4-YS. This structured packing comprises vertically oriented sheets with the corrugations at an angle to the vertical axis with the sheets being arranged such that the corrugation direction of adjacent sheets is reversed. The corrugations are may be sharp (sawtooth) but may also be rounded (sinusoidal). The sheets touch each other at contact points along the peaks and valleys of the corrugation, to provide paths for flow of coalesced liquid droplets. When used as structured packing for liquid/vapor contacting, the packing is installed in the tower as layers or tiers which are generally from 15 to 30 cm (6 to and 12 inches) in height. Adjacent layers are rotated around a vertical axis to enhance contacting. When used as a mist eliminator, it may be sufficient to use only a single layer of the packing material for bulk removal of droplets larger than 20 microns.

Other types of structured packing will also serve as mist eliminators, for example, the GLITSCH GRID™ and INTALOX™ packings of Koch-Glitsch.

Although the tower may conventionally have a circular horizontal cross section, other plans are possible including rectangular and square. In any event, the mist eliminator segment(s) in each tier extends only over a portion of the total plan (horizontal) cross section area of the of the tower, leaving a portion of the cross-section open to permit the ascending vapors to by-pass the eliminators when they become fouled. The mist eliminator segment(s) extend(s) over a major portion of the cross-sectional area of the tower, preferably, over 50-70% of the cross-sectional area of the tower so that the free flow area (tower cross-sectional are minus area occupied by the eliminator) of the flow passage at the level of the eliminator is correspondingly from 30 to 50 percent of the tower cross-sectional area. The eliminator segment(s) and, accordingly, the flow passages are respectively laterally displaced in the tower from the eliminator segment(s) and flow passage(s) in the adjacent tier(s) in a staggered configuration so that there is no continuous, direct (straight) flow passage up the tower unless the vapors pass through the mist eliminators: the vapors have to pass either through the eliminators and so up the tower or, when the eliminators become fouled, along the convoluted path to-and-fro around the eliminators. The open flow passages between the eliminator segments or between the segments and the opposing faces of the tower define a tortuous or zig-zag open flow path for the ascending vapors to by-pass the eliminators through the open flow passages when the eliminator segment(s) become fouled.

FIG. 1 shows this arrangement with the staggered locations in a two tier unit. In this case, the tower 10 is assumed to have a conventional, circular cross-section the size of which will depend upon the design throughput rate for the tower. The mist eliminator segments 11, 12 are fixed at two vertical locations in the tower with a vertical inter-unit separation, a, between the top of the lower eliminator 11 and the bottom of the upper eliminator 12. The vertical distance, b, between the same points on successive eliminator segments is then equal to the inter-segment separation, a, and the unit vertical thickness, v. An open flow passage 15 is defined between the chordal free edge 16 of lower mist eliminator segment 11 and the shell 17 of the tower. Similarly a flow passage 18 is defined between the free edge 19 of upper eliminator segment 12 and the shell plating 21 of the tower. In normal operation, the vapor with entrained liquid droplets flows upwardly into this mist eliminator section and through the mist eliminator segments when no or limited fouling has taken place. When the units become fouled over time, however, a vapor free flow path remains upwards from below this section, through vapor flow passage 15, between the eliminator segments 11 and 12 and then through the upper free flow passage 18, so enabling the tower to continue to function albeit at reduced liquid removal capability. In any event, the capability of the tower to continue operation in spite of fouling is maintained.

Figure 2:
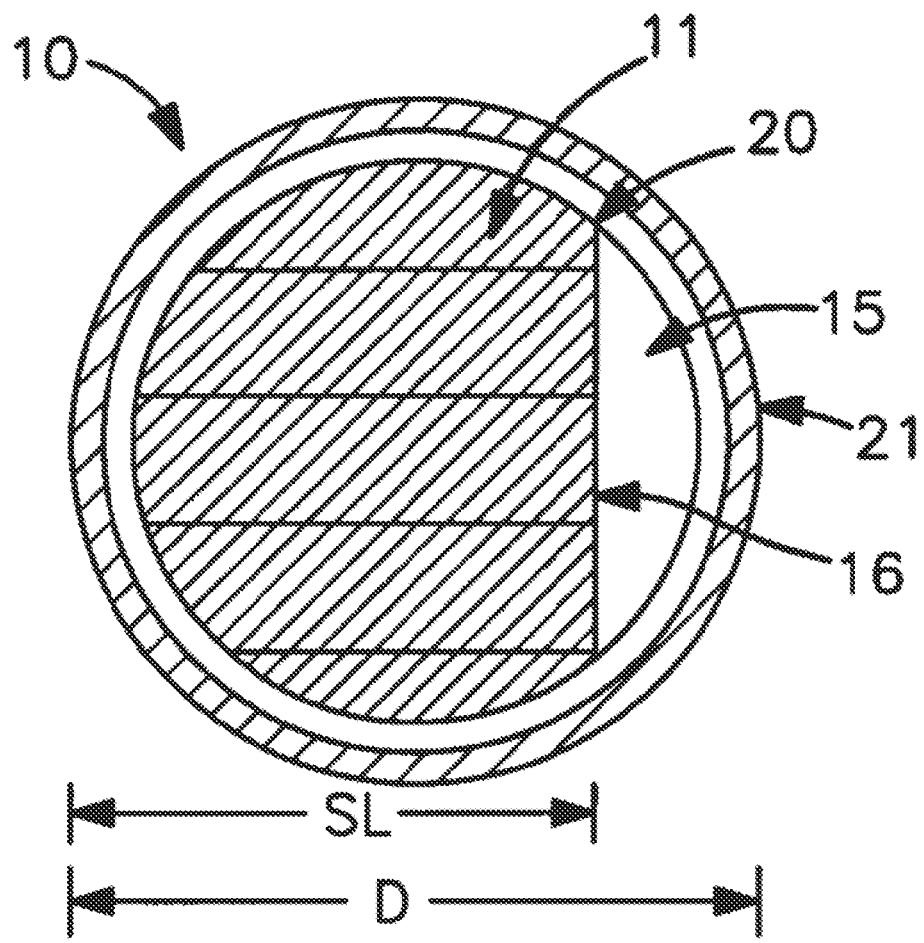
FIG. 2 is a simplified plan view of the mist eliminator section of the tower shown in FIG. 1 above the lower mist eliminator unit.

FIG. 2 is a plan view of the tower taken from a position immediately above the lower mist eliminator segment 11. The eliminator segment 11 is composed of a number of sections or "bricks" of appropriate size and shape to fit in the tower and held together by means of support rods extending through the individual sections. The entire eliminator tier is supported on ring 20 which acts as a support element and as a liquid collector ring in the conventional manner, acting to conduct accumulated liquid away from the eliminator to the liquid pool underneath (omitted from FIGS. 1, 3 for clarity). Ring 20 is secured to the shell 21 of the tower in the conventional manner, e.g. by riveting or welding.

Mist eliminator segments 11 and 12 in this case are segmental units which fit against the shell plating of the tower each with a chordal free edge 16, 19; flow passages 15, 18 are defined by the free edges 16, 19 and the shell plating 21 of tower 10.

For a test tower built to test the validity of the concept, the diameter of the tower was 120 cm (about 48 inches) with eliminator segment unit thickness, i, about 18 cm (about 7 inches). The maximal segmental length, SL, of the eliminator segments for the preferred range of free area (30-50% of tower cross-sectional area) will then be from about 50 to 65 percent of the tower diameter at that point with a corresponding horizontal overlap, i, when the segments have a segmental length greater than 50 percent of the tower diameter. The maximal segmental length taken is the maximal length of the segment defined between the arcuate edge opposite the chordal edge of the segment, taken though the center of the circumscribing circle of the segment (i.e. the tower). When the free area is at the maximum of 50 percent of the tower cross-section, the horizontal overlap between successive tiers will be zero. At the minimum free area of 30 percent, the segments will each have a segmental length of about 65 percent of the tower diameter, so that the overlap, i, will be about 30 percent of the total tower diameter. As another example, when the segmental length of the eliminator segments is approximately 81 percent of tower diameter with an overlap distance, i, of approximately 62 percent of tower diameter, the free area of the flow passages will be approximately 40 percent of the tower cross-sectional area. The areas of the open flow passages are generally equal to one another but since fouling is most likely to occur in the lowest and typically, the hottest, segment, the open flow passage between this mist eliminator tier and the next higher mist eliminator tier may be wider to allow for by-passing to take place more readily, passing the droplet removal duty to the next higher mist eliminator tier when the lower mist eliminator tier becomes fouled and unserviceable. In this case, however, it may be necessary to use a greater number of tiers of segments to maintain droplet removal performance over time.

Figure 3:
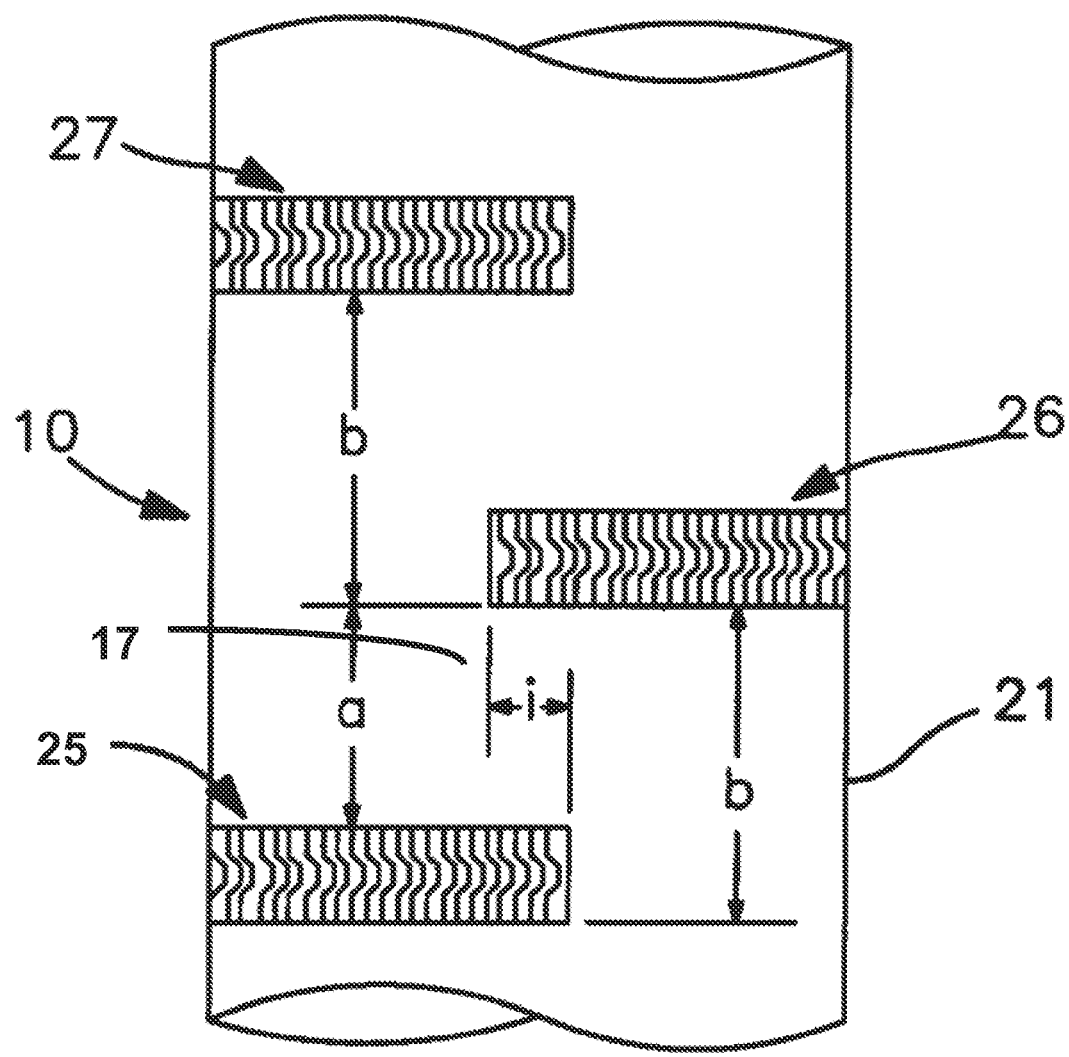
FIG. 3 is a simplified vertical section of the mist eliminator section of a tower with staggered vane-type mist eliminators in three tiers.

In order to maintain an orderly vapor flow up the tower, it is preferred that the mist eliminator tiers be separated vertically by a distance which defines a flow area between the free end of one eliminator and the overhanging surface of the next successive eliminator which is equal to the area of the open flow passages at the edges of the eliminators. Generally, two or three tiers of eliminators will be sufficient within the tower. FIG. 3 shows an arrangement similar to FIG. 1 but in this case with three mist eliminator segments, 25, 26, 27 in tower 10 with similar or identical ranges of overlap as discussed above to provide the zig-zag flow passage up the tower for the vapor stream.

Figure 4:
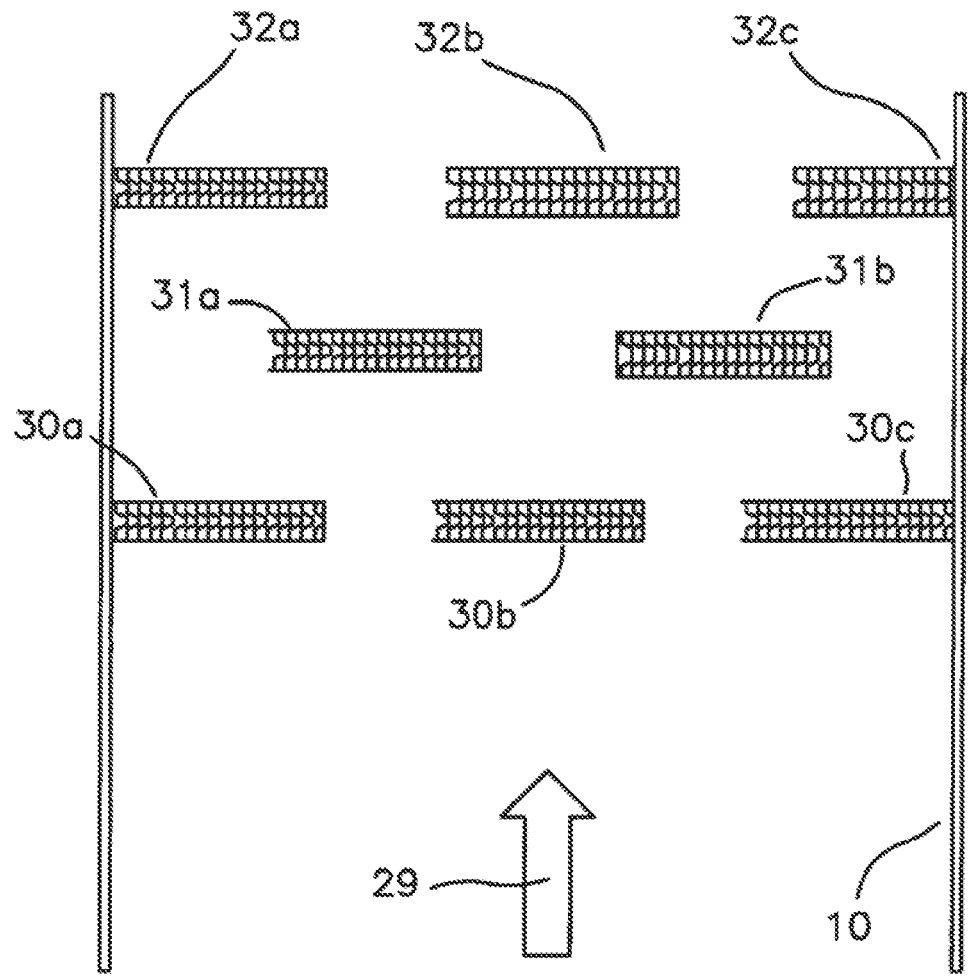
FIG. 4 is a simplified vertical section of the mist eliminator section of a tower with a plurality of staggered vane-type mist eliminator segments in three tiers.

FIG. 4 shows how the eliminator segments may be located in a wide tower, for example, about 3 m (about 10 feet) in diameter. In a tower with a cross-section of this magnitude, the use of a single eliminator segment as shown in FIGS. 1-3 could lead to significant disruption in the vapor flow around the segment when it became fouled: the use of a plurality of spaced segments in each tier avoids this difficulty by allowing for a flow path that is more linear in nature. Again, the area of the tower cross-section taken up by the segments should preferably be from 50 to 70 percent with the open space between the segments complementarily taking up 30 to 50 percent of the total cross-section. The inter-tier spacing should also be as described above. In FIG. 4, three tiers of eliminator segments are located at vertically spaced intervals in tower 10 with the upward flow of vapors in the tower indicated by arrow 29. The lowermost mist eliminator tier is constituted by segments 30a, 30b and 30c with segments 31a and 31b in the middle tier and segments 32a, 32b, 32c in the uppermost tier. As can be seen, the open spaces between the segments (top and bottom tiers) and between the segments and the opposed inner surfaces of the tower (middle tier) provide open by-pass passages through which the vapor can how when the segments become fouled. The top tier of segments may be deleted for retrofit applications with limited vertical spacing that allow only two tiers of staggered vane-type mist eliminator segments.

When two or more eliminator segments are arranged across the tower as shown in FIG. 4, the segments may be arranged in a ladder type arrangement with the segments extending all the way across the tower from one curved side of the shell plating to the other so that the open by-pass flow passages are approximately rectangular in shape (with curved short ends) or, alternatively, in a checkerboard type arrangement in which the segments are deployed across the tower in rows with a number of segments in each row and open flow passages between the individual segments in the row. Adjacent rows are abutted right against one another but the individual segments are arranged in a fashion like unto a chess board in which a single segment is surrounded by four open flow passages and four other segments. So, in this arrangement, the segments are arranged as (Row 1) A-B-A-B-A, (Row 2) B-A-B-A-B, (Row 3) A-B-A-B-A, where A is a segment and B is an open flow passage. In either arrangement, the segments will be supported by rods extending across the tower and secured to the tower walls as described above with reference to FIG. 2.

By providing the potential to bypass the device as fouling progresses, the present mist eliminator configuration has the capability to increase the run length between maintenance cycles and minimize potential reductions to unit capacity due to fouling compared to traditional mist eliminator configurations. To ensure, however, that the vapors with the entrained liquid droplets actually pass through the mist eliminators, the area of the flow passages at the edges of the eliminator segments should be selected based on the pressure drop through the mist eliminators both in the clean condition and in the fouled condition which is to be expected over the projected service life between eliminator replacements. This obviously has to be determined on a basis of empiricism, depending on the flow characteristics of the vapor stream passing through the tower. Greater pressure drop through the mist eliminators will obviously favor mist eliminator by-passing with consequent loss of efficiency. The operator therefore has to make an assessment of these and other relevant factors in selecting the appropriate mist eliminator. The pressure drop through each tier of the mist eliminator can be varied by appropriate selection of the packing structure used in the mist eliminator (tier thickness, closeness of vanes etc).

It has been shown that the liquid droplet removal efficiency for the configuration is over 90% for droplets 40 microns and larger which is much greater than the efficiency of an open chamber.

The invention claimed is:

1. A tower having a vertical axis with an upward flow path for heavy oil vapors ascending the tower and a mist eliminator system comprising at least two tiers of mist eliminators at a plurality of vertically spaced levels in the tower, each tier comprising at least one horizontally extensive mist eliminator segment extending over a major portion of the cross-sectional area of the tower to define at least one open vapor flow passage at the level of the tier through which the upward flow of vapor may take place without passing through the at least one mist eliminator segment of the tier, the at least one open vapor flow passage of each tier being laterally displaced from the at least one open vapor flow passage of a vertically spaced tier to define a tortuous flow path for vapors ascending the tower through the open flow passages in the at least two tiers; wherein the at least one mist eliminator segment in each tier allows a portion of the vapors ascending the tower to pass through the at least one mist eliminator segment itself when the at least one mist eliminator segment is in an unfouled condition; the at least one mist eliminator segment comprises structured packings; and the at least one mist eliminator segment comprises: a plurality of spaced-apart, generally aligned, parallel impingement type baffles extending generally across a vapor stream flow direction to define a tortuous vapor flow path for the vapor stream passing between the parallel impingement type baffles.

2. A tower according to claim 1 in which the at least one mist eliminator segment are arrayed substantially horizontally across the tower.

3. A tower according to claim 1 in which the at least one mist eliminator segment of each tier extends over 50 to 70 percent of a cross-sectional area of the tower at a level where each of the at least two tiers is disposed, to define an open flow passage at the level of the tier equal to 30 to 50 percent of the cross-sectional area of the tower at a level where each of the at least two tiers is dispose.

4. A tower according to claim 1 in which the at least two tiers are separated vertically by a distance which defines a vertical flow area between the at least two tiers which is equal to a horizontal area of the at least one open vapor flow passage in a vertically spaced tier.

5. A tower according to claim 1 in which the at least one mist eliminator segment is chevron or vane type baffle eliminators.

6. A tower according to claim 1 in which the at least one mist eliminator segment comprises vertically oriented corrugated sheets having corrugations at an angle to a vertical axis with a corrugation direction of adjacent sheets reversed with respect to one another and with the vertically oriented corrugated sheets touching each other at contact points along peaks and valleys of the corrugations, to provide paths for flow of coalesced liquid droplets.

7. A tower according to claim 1 in which each of the parallel impingement type baffles includes a short, straight, inlet section axially with respect to the vapor stream flow direction, having a lower leader edge, and a lower angled section, a short, straight, axially aligned interconnecting section, an upper angled section, and a short, straight, axially aligned outlet section leading up to an outlet edge.

8. A tower according to claim 7 in which the parallel impingement type baffles include an upper angled section having a greater angular inclination from a vertical axis of a mist eliminator and of a gas flow direction than the lower angled section.

9. A tower according to claim 1 in which each tier comprises at least two mist eliminator segments.

10. A tower according to claim 9 in which in each tier the eliminator segments are disposed in rows spaced apart from one another and extending from one side of the tower to the other to define open flow passages between adjacent rows.

11. A tower according to claim 9 in which in each tier the eliminator segments are arranged in rows extending from one side of the tower to the other with individual segments in each row spaced apart from one another to define open flow passages between adjacent segments in each row and with adjacent rows abutting one another with the individual segments in adjacent rows displaced from one another in checkerboard formation.

12. A tower having a vertical axis with an upward flow path for heavy oil vapors ascending the tower and a mist eliminator system comprising mist eliminator segments at a plurality of vertically spaced tiers in the tower, each mist eliminator segment extending over a major portion of a cross-sectional area of the tower to define an open flow passage at a level of one of the plurality of vertically spaced tiers between a free edge of the mist eliminator segment and a opposing periphery of the tower, the open flow passage in each tier being laterally displaced from the open flow passage in a vertically spaced tier to define a tortuous open flow path through which the upward flow of vapor may take place without passing through a mist eliminator segment in the tier, wherein each open flow passage has a cross-sectional area; wherein the mist eliminator segment(s) in each tier allows a portion of the vapors ascending the tower to pass through the mist eliminator segment(s) itself when the mist eliminator segment(s) is in an unfouled condition; the at least one mist eliminator segment comprises structured packings; and the at least one mist eliminator segment comprises: a plurality of spaced-apart, generally aligned, parallel impingement type baffles extending generally across a vapor stream flow direction to define a tortuous vapor flow path for the vapor stream passing between the parallel impingement type baffles.

13. A tower according to claim 12 in which each mist eliminator segment comprises a segmental element having a free chordal edge defining an open flow passage between the free chordal edge and the opposing periphery of the tower, with the open flow passage in a tier and the open flow passage between another vertically spaced tier(s) defining a tortuous flow path for vapors ascending the tower.

14. A tower according to claim 12 in which each open flow passage has a cross-sectional area, wherein the cross-sectional area of each open flow passage is the equal to the cross-sectional areas of other open flow passages.

15. A tower according to claim 12 in which each mist eliminator segment extends over 50 to 70 percent of a cross-sectional area of the tower at a level of the mist eliminator segment.

16. A tower according to claim 12 in which each mist eliminator segment is separated vertically by a distance which defines a vertical flow area between the free edge of one mist eliminator segment and an overhanging surface of a next successive mist eliminator segment which is equal to the cross-sectional area of each open flow passage.

17. A tower according to claim 12 in which each mist eliminator segment is a chevron type baffle eliminator.

18. A tower according to claim 12 in which each of the parallel impingement type baffles includes a short, straight, inlet section axially with respect to the vapor stream flow direction, having a lower leader edge, and a lower angled section, a short, straight, axially aligned interconnecting section, an upper angled section, and a short, straight, axially aligned outlet section leading up to an outlet edge.

19. A tower according to claim 18 in which the parallel impingement type baffles include an upper angled section having a greater angular inclination from a vertical axis of a mist eliminator and of a gas flow direction than the lower angled section.

* * * * *